(12) United States Patent
Hilton et al.

(10) Patent No.: US 8,234,953 B2
(45) Date of Patent: Aug. 7, 2012

(54) HIGH SPEED FLYWHEEL CONTAINMENT

(75) Inventors: Jonathan James Robert Hilton, Banbury (GB); Douglas Isaac Lascelles Cross, Milton Keynes (GB)

(73) Assignee: Flybrid Systems LLP, Silverstone (GB)

( * ) Notice: Subject to any disclaimer, the term of this patent is extended or adjusted under 35 U.S.C. 154(b) by 297 days.

(21) Appl. No.: 12/598,195

(22) PCT Filed: Mar. 28, 2008

(86) PCT No.: PCT/GB2008/001133
§ 371 (c)(1),
(2), (4) Date: Oct. 29, 2009

(87) PCT Pub. No.: WO2008/142363
PCT Pub. Date: Nov. 27, 2008

(65) Prior Publication Data
US 2010/0126302 A1    May 27, 2010

(30) Foreign Application Priority Data
May 17, 2007 (GB) .................................. 0709456.8

(51) Int. Cl.
H02K 7/02 (2006.01)
(52) U.S. Cl. ................................... 74/572.11
(58) Field of Classification Search ................ 74/572.1, 74/572.11, 572.2; 310/74
See application file for complete search history.

(56) References Cited

U.S. PATENT DOCUMENTS

| | | | |
|---|---|---|---|
| 1,879,855 A | 9/1932 | Morton | |
| 3,242,742 A * | 3/1966 | Parker | 74/5.7 |
| 3,853,328 A | 12/1974 | Pierce | |
| 5,272,403 A | 12/1993 | New | |
| 5,419,212 A * | 5/1995 | Smith | 74/5.1 |
| 5,643,026 A | 7/1997 | Pietsch et al. | |
| 6,481,720 B1 | 11/2002 | Yoshida et al. | |
| 7,034,420 B2 * | 4/2006 | Brackett et al. | 310/74 |
| 2004/0201179 A1 | 10/2004 | Iwakata et al. | |

FOREIGN PATENT DOCUMENTS

| | | |
|---|---|---|
| CA | 1144784 | 4/1983 |
| DE | 2454753 | 5/1976 |
| DE | 2803474 | 8/1979 |
| DE | 3912389 | 10/1990 |
| EP | 0181736 | 5/1986 |
| FR | 2189712 | 1/1974 |
| GB | 1492965 | 11/1977 |
| GB | 1557522 | 12/1979 |

(Continued)

OTHER PUBLICATIONS

International Search Report for PCT/GB2008/001132 mailed Jul. 16, 2008.

(Continued)

Primary Examiner — Vicky Johnson
(74) Attorney, Agent, or Firm — Knobbe Martens Olson & Bear, LLP

(57) ABSTRACT

The present invention provides a high inertia flywheel for a vehicle including a hub, a periphery of which is surrounded by a rim, and a housing, wherein at least one annular ring is provided on either side of the flywheel, whereby, on oscillation of the flywheel, a contact surface of the flywheel contacts against a contact surface of the annular ring, thus causing friction.

14 Claims, 5 Drawing Sheets

| FOREIGN PATENT DOCUMENTS | | |
|---|---|---|
| GB | 2033977 | 5/1980 |
| GB | 2121124 | 12/1983 |
| GB | 2213539 | 8/1989 |
| NL | 9002415 | 6/1992 |
| WO | WO 97/24536 | 7/1997 |
| WO | WO 03/024126 | 3/2003 |

OTHER PUBLICATIONS

International Search Report for PCT/GB2008/001133 mailed Jul. 16, 2008.
Search Report for GB0709456.8 dated Sep. 5, 2007.
Search Report for GB0708665.5 dated Aug. 23, 2007.

* cited by examiner

HIGH SPEED FLYWHEEL CONTAINMENT

CROSS-REFERENCE TO RELATED APPLICATIONS

This application is the U.S. National Phase under 35 U.S.C. §371 of International Application No. PCT/GB2008/001133, filed Mar. 28, 2008, designating the United States and published in English on Nov. 27, 2008, as WO 2008/142363, which claims priority to United Kingdom Application No. 0709456.8, filed May 17, 2007.

FIELD OF THE INVENTION

This invention relates to flywheels, and particularly to high speed flywheels for use in vehicles.

DESCRIPTION OF RELATED ART

Flywheels typically comprise a relatively heavy mass, arranged to rotate around a shaft. Bearings are provided to rotatably couple the shaft to a housing. The use of flywheels in vehicles is known, for example as an aid for acceleration or deceleration of the vehicle. It is also known to use a flywheel as a battery, whereby the kinetic energy of the flywheel is converted into electrical energy. The kinetic energy of a flywheel is directly proportional to the rotational inertia and the square of the angular velocity. A flywheel used for energy storage in a vehicle must achieve an optimum balance of mass, inertia and rotational speed. The faster the flywheel can be made to rotate, the smaller and lighter it will be for a given storage capacity.

Stationary flywheels are capable of high speeds, for example greater than 100,000 revs per minute. However, flywheels used in vehicles typically run at speeds of around 20,000 revs per minute or lower, due to certain constraints. Firstly, the speed at which a flywheel within a vehicle can operate is limited by susceptibility to vibration caused on operation of the vehicle, which can cause significant strain on the flywheel mounting and bearings, thereby increasing friction and wear and reducing the efficiency of the flywheel, and furthermore constituting a potential safety risk. The susceptibility of the flywheel to vibration can be minimised by providing a flywheel which has a high natural frequency of vibration.

For the above reasons, flywheels in vehicles must adhere to stringent safety criteria, including provision of a benign, or at least controllable, failure mode. When the primary failure mode, i.e. the mode which occurs at the lowest rotational speed, is reached, the flywheel and its housing must be designed to contain all debris generated on the breaking up of the flywheel components.

On failure of the flywheel, cracking of the hub occurs at a crack site, causing a loss of stiffness of the connection between the flywheel and the bearings. As a result, the flywheel becomes unstable, causing it to oscillate on the shaft. If the oscillation is unrestrained, it will grow larger, thus generating excessive strain at the crack site and causing the crack to lengthen until complete failure of the flywheel occurs, i.e. the rim becomes disconnected from the bearings.

When the flywheel fails, the large amount of kinetic energy stored in the flywheel dissipates very quickly and a large instantaneous pressure is generated within the flywheel housing. It is necessary to contain the debris generated by the failure, which can require a large and heavy containment means. The problems encountered on failure of a flywheel and containment of the debris are extenuated by the short amount of time during which the energy is dissipated.

SUMMARY OF THE INVENTION

An aim of the present invention is to address the problems encountered on failure of a flywheel, and particularly to increase the time over which the flywheel energy is dissipated.

Accordingly the present invention provides a high inertia flywheel as claimed in claim 1 of the appended claims.

An advantage of the present invention is that on failure of the flywheel, the time taken for the flywheel to break up is extended, and the energy is released over a longer period of time. It is therefore easier to safely contain the debris produced, and may allow sufficient time for a control system to safely reduce the speed of the failed flywheel.

Preferably the annular ring is provided on a flange provided on the housing, such that the surface which contacts the annular ring is located on an inside surface of the periphery. An advantage of this is that when the hub contacts the ring on oscillation of the flywheel, the surface speed, and therefore the energy generated by the frictional contact, is much lower than it would be if contact were made on the outside of the rim.

The annular rings may be provided with inwardly and/or outwardly projecting flanges, whereby the flanges have an abutment face in close proximity to the periphery end faces, the webs, or some other substantially radial surface. An advantage of providing flanges on the annular rings having abutment faces is that on failure of the flywheel, the flywheel is caused to contact an increased surface area, therefore causing a greater amount of friction thereby causing a greater reduction in speed of the flywheel. Furthermore, if the failure of the flywheel progresses to the state where the rim and the shaft are disconnected or the stiffness of the connection has sufficiently deteriorated, the axial movement of the flywheel rim is controlled, and the period during which the rim rotates substantially in its original position around the original centreline of the shaft is extended, thereby further dissipating energy.

A surface coating may be applied to the annular ring and/or the part of the hub which contacts the ring on oscillation of the flywheel. The surface coating could be selected, for example, to control the rate of deceleration or the heat generation. A coating with a high coefficient of friction such as a brake lining material would provide a high rate of deceleration, which may be appropriate in some applications. In other applications a coating with a low coefficient of friction such as Diamond Like Carbon (DLC) would reduce the rate of deceleration and minimise heat generation.

Preferably the design of the hub is such that the highest stress is in the webs that connect the shaft to the rim, causing the primary failure mode of the flywheel to be failure of the metal hub by cracking. Particular design features which would ensure that the primary failure mode is cracking of the metal hub could include, for example, particular mass distributions at different radii. The stress occurring in the webs on rotation of the flywheel is also affected by the thickness of the web. For example, a web of substantially constant thickness would result in the highest stress occurring towards the centre of the flywheel, due to the effect of the mass of the portion further away from the centre effectively pulling on the portion at the centre as the flywheel rotates.

An advantage of the primary failure mode of the flywheel being cracking of the hub is that as the hub fails by cracking and breaks up, the composite rim, which has a considerable reserve of strength, acts to contain the resultant debris.

DETAILED DESCRIPTION OF PREFERRED EMBODIMENTS

Figure 1:
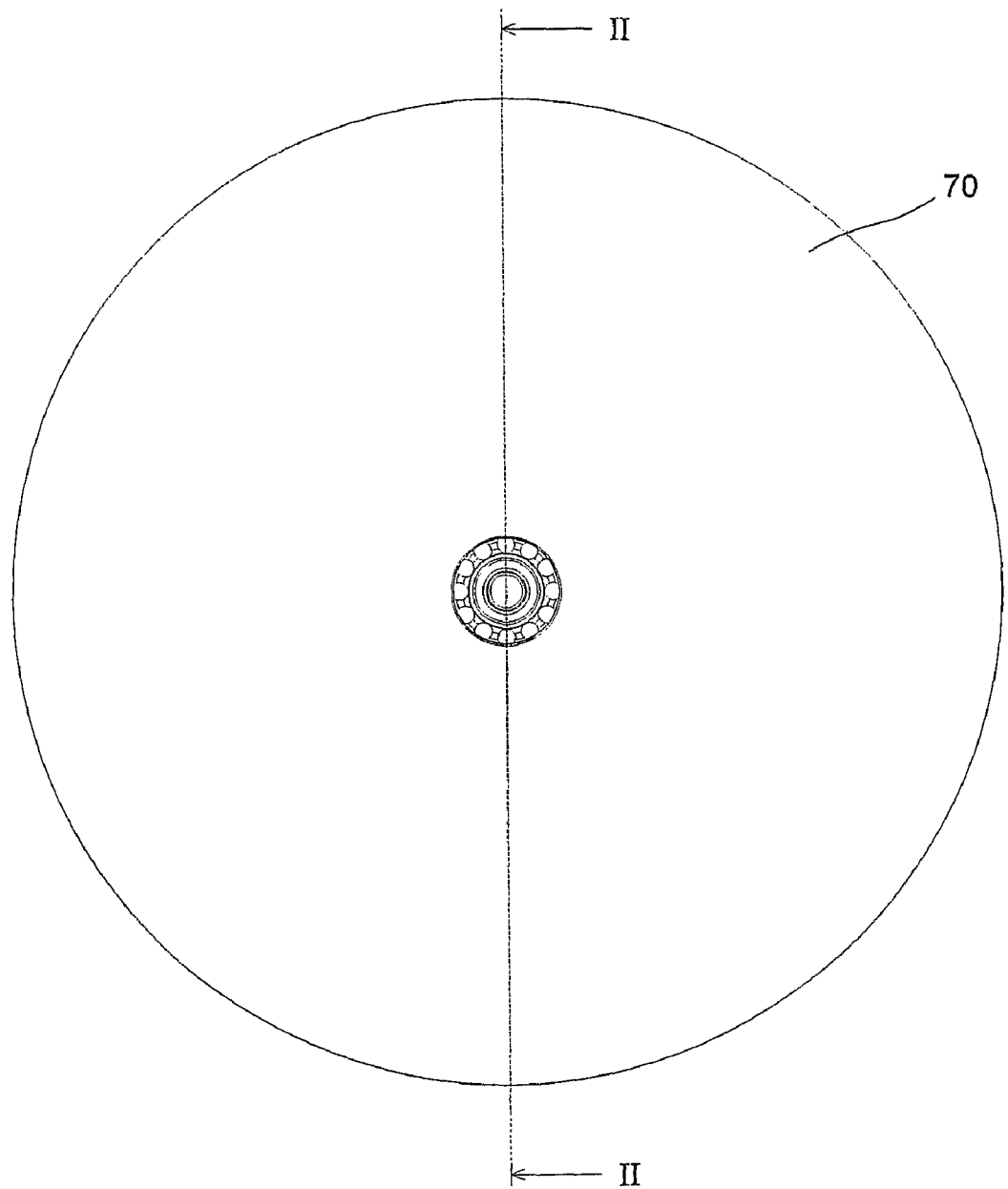
FIG. 1 is a side elevation of a flywheel in accordance with the present invention.
Figure 2:
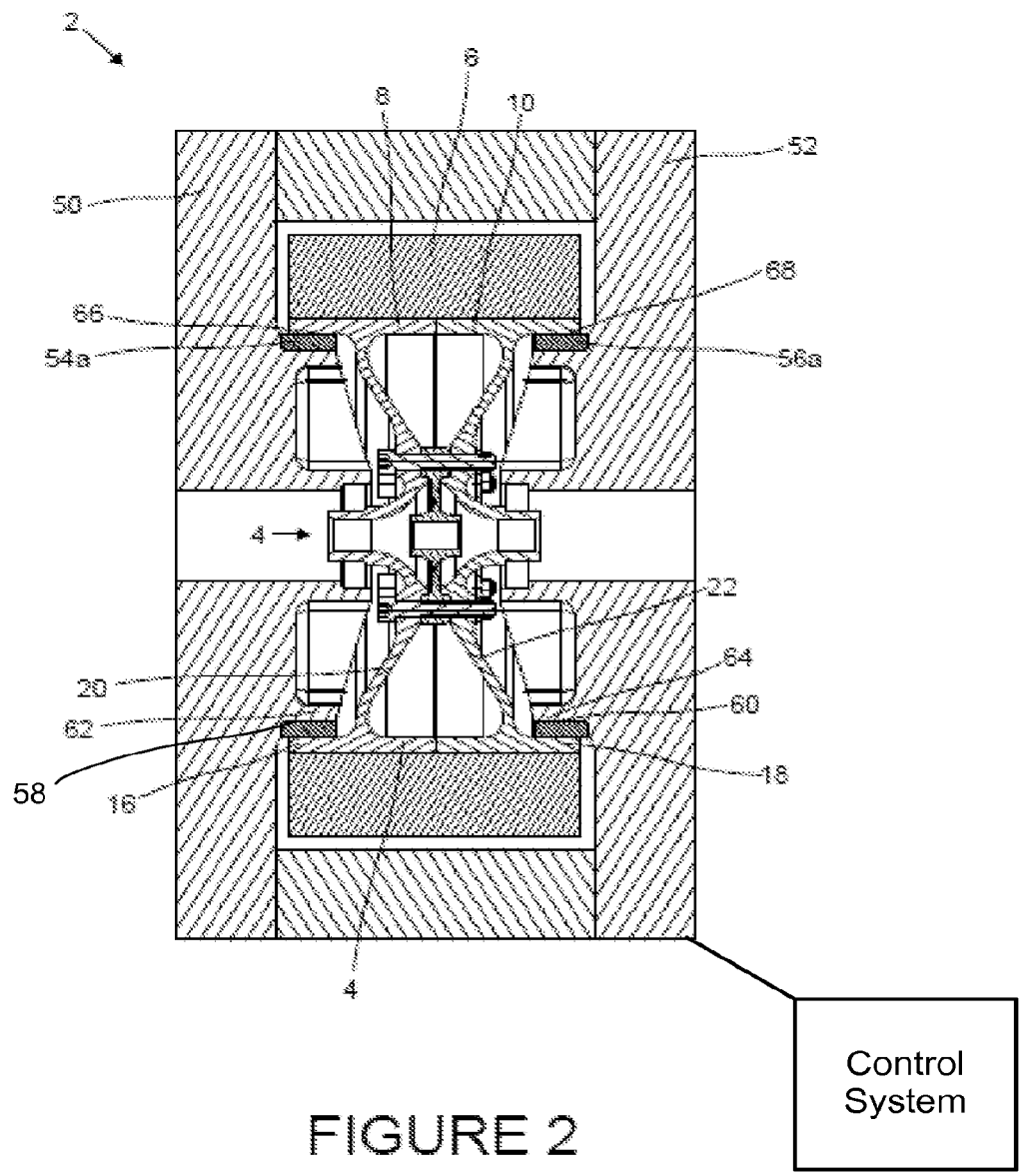
FIG. 2 is a cross sectional view of the flywheel of FIG. 1 along the lines II-II; including a schematic representation of a control system in accordance with certain embodiments of the invention.

Referring to FIGS. 1 and 2, the flywheel 2 comprises steel hub arrangement 4 with a wound carbon fibre composite rim 6.

The hub 4 is formed of two halves 8, 10, each having a periphery 16, 18. The two halves 8, 10 of the hub are of equal diameter and the inner diameter of the rim 6 is selected such that when it is fitted over the outside of the hub arrangement 4, a radial interference fit is achieved, thus ensuring that the rim 6 stays in compression with the hub 4 at high operating speeds.

The hub is formed with webs 20, 22, which extend from the inside surface of the periphery towards the centre of the flywheel. The stress generated in the web by rotation of the flywheel is higher than that in the radial thickness of the rim, such that the primary failure mode of the flywheel will be the failure of the hub by cracking of the web.

The flywheel 2 is contained in a housing 70 comprising two end caps 50, 52 and a vacuum is maintained within the housing.

Annular rings 54a, 56a are provided on either side of the flywheel 2, and are fitted by an interference fit on annular shoulders 58, 60 provided on a flange 62, 64 provided on each end cap 50, 52. There is a small clearance between each annular ring 54a, 56a and each half of the hub 8, 10, such that the annular rings 54a, 56a are in close proximity to, but not in contact with, the hub 4.

If the flywheel 2 is caused to oscillate, for example by vibration on operation of the vehicle, contact surfaces 66, 68 on the inside of the peripheries 16, 18, are caused to contact the annular rings 54a, 56a, and therefore the oscillation is controlled. The small clearance between the hub 4 and contact surfaces 66, 68 ensures the force on the annular rings 54a, 56a is not too great, and ensures that even minor oscillation is controlled.

Oscillation of the flywheel 2 will also be caused as it begins to fail by cracking of the hub 4, again causing the contact surfaces 66, 68 to contact the annular rings 54a, 56a. The friction generated between the contact surfaces 66, 68 and the annular rings 54a, 56a will cause the flywheel 2 to reduce in speed. The strain at the crack site in the hub 4 will therefore be controlled, and the propagation of the crack will occur slowly. Therefore as the crack propagates to cause the hub to break up, the instantaneous pressure generated within the flywheel housing is lower than if the crack has propagated at a faster rate. Therefore the debris resulting from the failure can be more easily contained by the flywheel rim 6.

Figure 3:
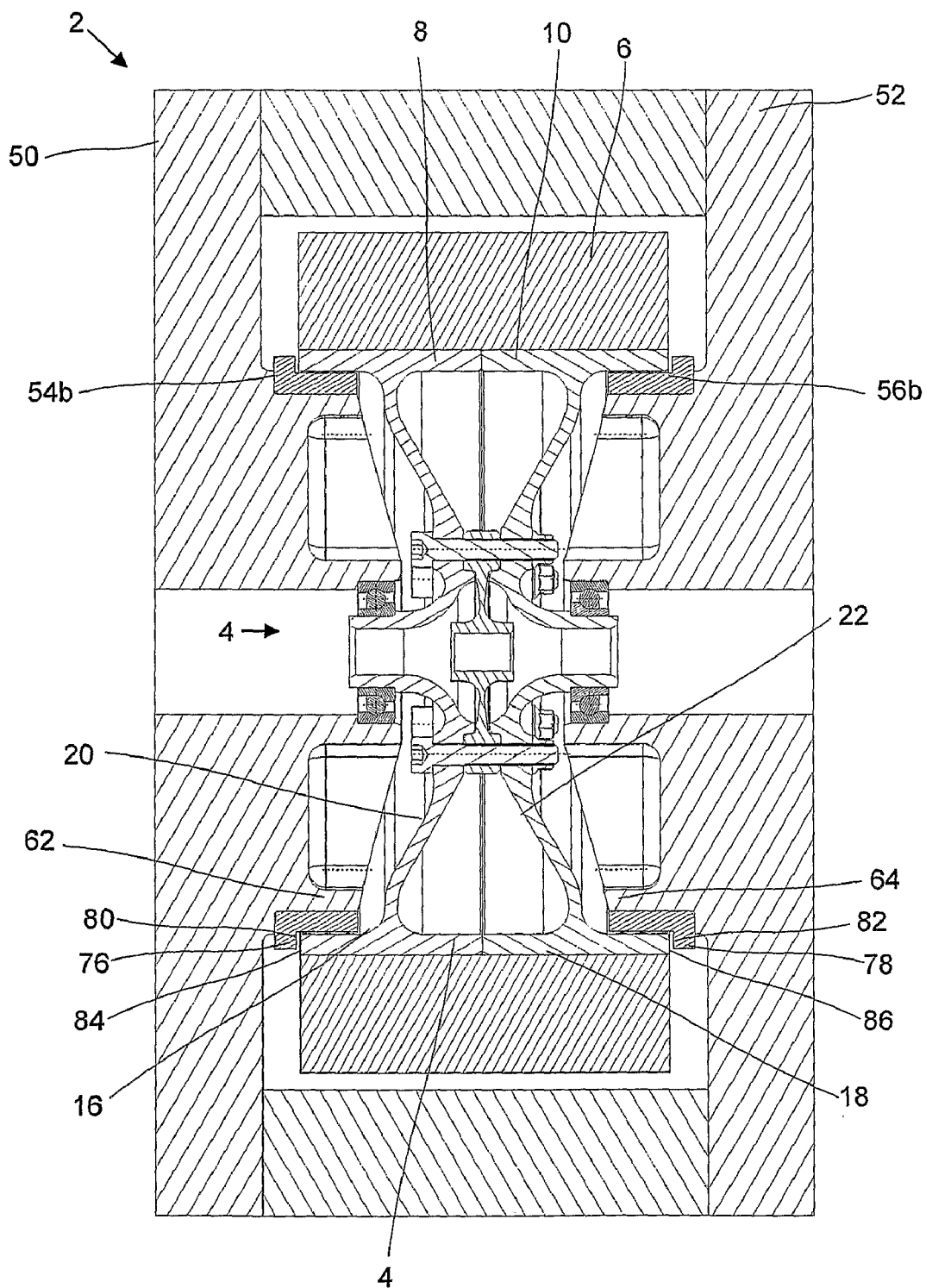
FIGS. 3 and 4 are cross sectional views of alternative embodiments of the flywheel of FIG. 1 along the lines II-II.
Figure 5:
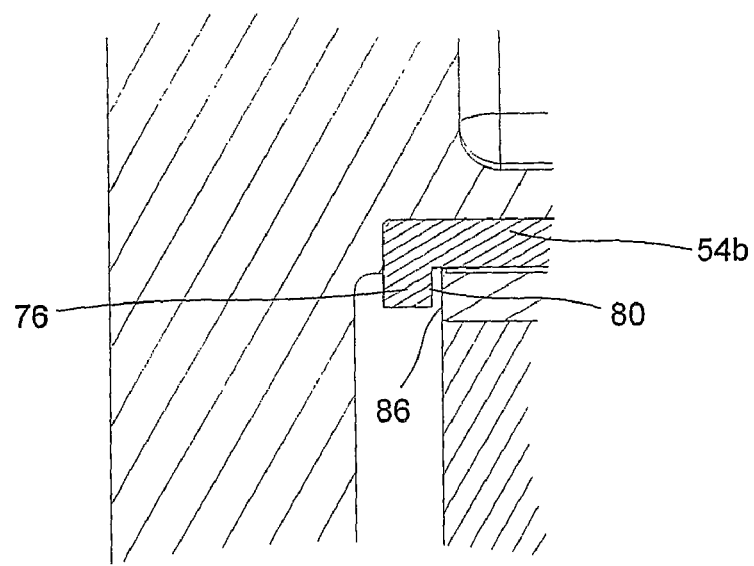
FIGS. 5 and 6 are partial detailed views of the embodiments of FIGS. 3 and 4 respectively.

The annular ring may be of an alternative cross sectional form. The embodiment of FIGS. 3 and 5 illustrates annular rings 54b, 56b each having a flange 76, 78 projecting outwardly away from the centre of the flywheel 2. On failure and subsequent oscillation of the flywheel, abutment faces 80, 82, of the flanges 76, 78 are caused to contact the end faces 84, 86 of the hub peripheries 18, 20, therefore providing a further reduction in speed of the flywheel due to friction between the surfaces 80, 82 and the periphery end faces 84, 86. The flanges 76, 78 also provide axial restraint as the flywheel breaks up on failure.

Figure 4:
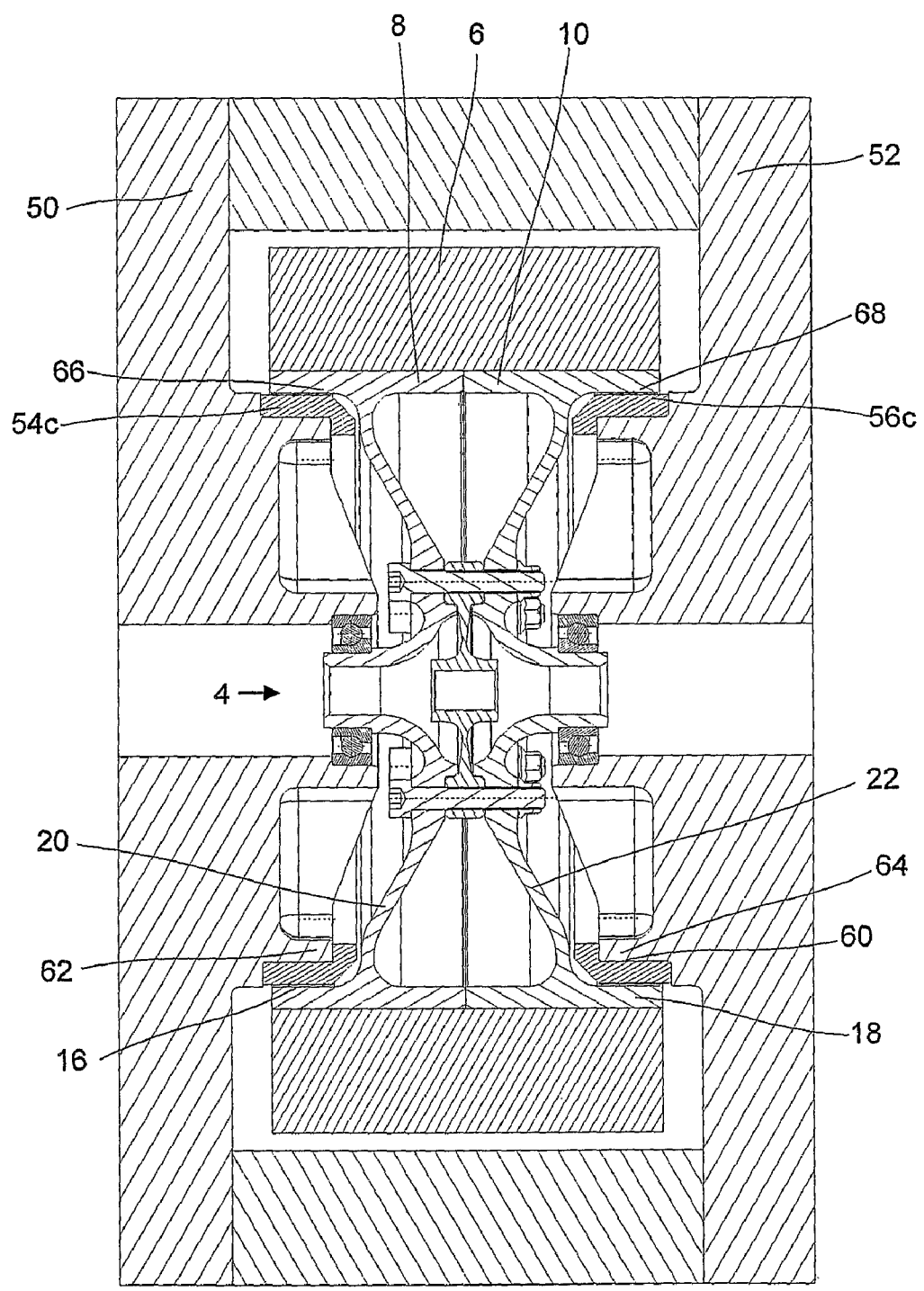
Figure 6:
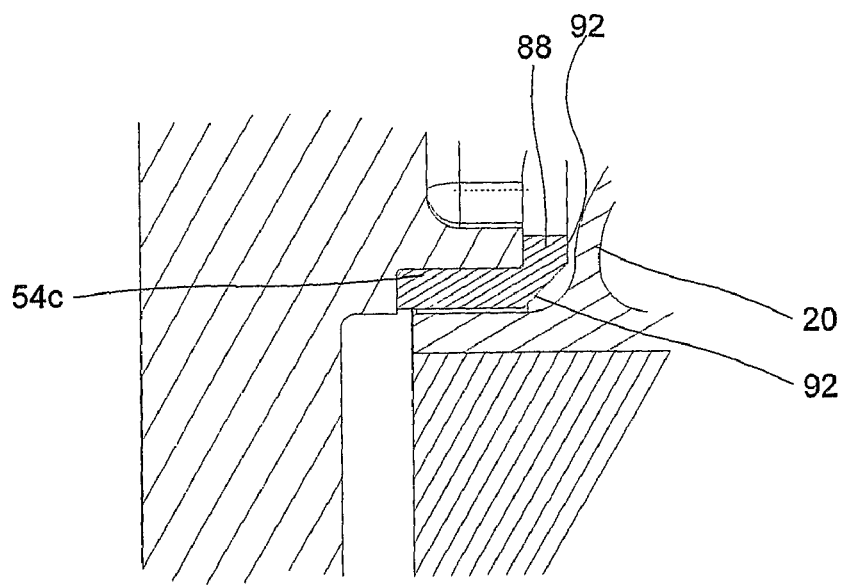

In the embodiment of FIGS. 4 and 6, the annular rings 54c, 56c are each provided which a flange 88, 90 which projects inwardly toward the centre of the flywheel 2. A chamfer 92 is also provided on the outside joint of the annular ring 54c, 56c and the flange 88, 90. As the flywheel 2 begins to oscillate on failure, the webs 20, 22 are caused to contact abutment faces 94, 96, therefore providing a further reduction in speed of the flywheel due to the friction caused between the surfaces 94, 96 and the webs 20, 22.

In the embodiments of FIGS. 3 and 4, if failure of the flywheel 2 progresses to the state where the rim 6 and the shaft are disconnected, or the stiffness of the connection has sufficiently deteriorated, the abutment faces may prolong the period during which the rim 6 rotates substantially in place around its original centreline, thereby further dissipating energy.

A control system (shown in FIG. 2) may be used to detect the onset of failure of the flywheel, and accordingly to reduce the speed of the flywheel in a controlled fashion.

The control system could be arranged to measure the measure the rate of change of speed of the flywheel, and when the inertia is known, the system can calculate the power being generated or absorbed at any instant. By comparing this power to the measured power at the output shaft, any sudden departure from the expected behaviour can be determined, and the speed of the flywheel can be reduced in response.

Alternatively, the control system could be arranged to measure the temperature of the housing close to the annular ring, such that any sudden increase in temperature, caused by friction when the hub contacts the annular ring, can be detected and the speed of the flywheel can be reduced in response.

Once the control system has detected that the speed of the flywheel must be reduced, the speed reduction could be achieved by the transmission of power in the normal way. Alternatively, the speed could be reduced by the injection of a substance into the housing, such as water or oil, which absorbs the energy released as the flywheel breaks up, and dissipates the energy safely by heating up and/or changing state. As the flywheel runs in a vacuum, the injection of the substance does not require a pump, and could be virtually instantaneous, therefore on the opening of a solenoid valve, the substance would flow rapidly into the housing.

What is claimed is:

1. A flywheel system for a vehicle comprising a flywheel, a housing, and at least two annular rings, the flywheel system comprising:

a flywheel hub and a rim, wherein a periphery of the flywheel hub is surrounded by the rim, and wherein at least one annular ring is provided at a first side of the flywheel within the housing and at least one annular ring is provided at a second side of the flywheel within the housing, wherein each annular ring is fitted to the housing in an interference fit, and wherein the annular rings have a diameter less than that of the periphery of the flywheel hub; and wherein a contact surface of each annular ring is in close proximity to a contact surface of the flywheel hub periphery;

such that, on oscillation of the flywheel, the contact surface of each annular ring contacts against the contact surface of the flywheel hub periphery, thus causing friction.

2. A flywheel system as claimed in claim 1 wherein each annular ring is fitted on a flange provided on the housing.

3. A flywheel system as claimed in claim 1 wherein each annular ring has an inwardly projecting flange having an abutment face in close proximity to a substantially radial surface of the flywheel.

4. A flywheel system as claimed in claim 3 wherein a coating is applied to the abutment face.

5. A flywheel system as claimed in claim 1 wherein a coating is applied to the contact surface of the annular rings.

6. A flywheel system as claimed in claim 5 or claim 4 wherein the coating has a high coefficient of friction.

7. A flywheel system as claimed in claim 6 wherein the coating is a brake lining material.

8. A flywheel system as claimed in claim 5 or claim 4 wherein the coating has a low coefficient of friction.

9. A flywheel system as claimed in claim 8 wherein the coating is Diamond Like Carbon.

10. A flywheel system as claimed in claim 1 wherein each annular ring has an outwardly projecting flange having an abutment face in close proximity to a substantially radial surface of the flywheel.

11. A flywheel system as claimed in claim 1 which includes a control system to reduce the speed of the flywheel on failure.

12. A flywheel system as claimed in claim 1 wherein a coating is applied to the contact surface of the flywheel.

13. A flywheel system as claimed in claim 1 wherein the design of the flywheel assembly is such that the primary failure mode is cracking of the flywheel hub.

14. A flywheel system as claimed in claim 1 wherein the annular rings are formed of steel.

* * * * *